Patented July 28, 1925.

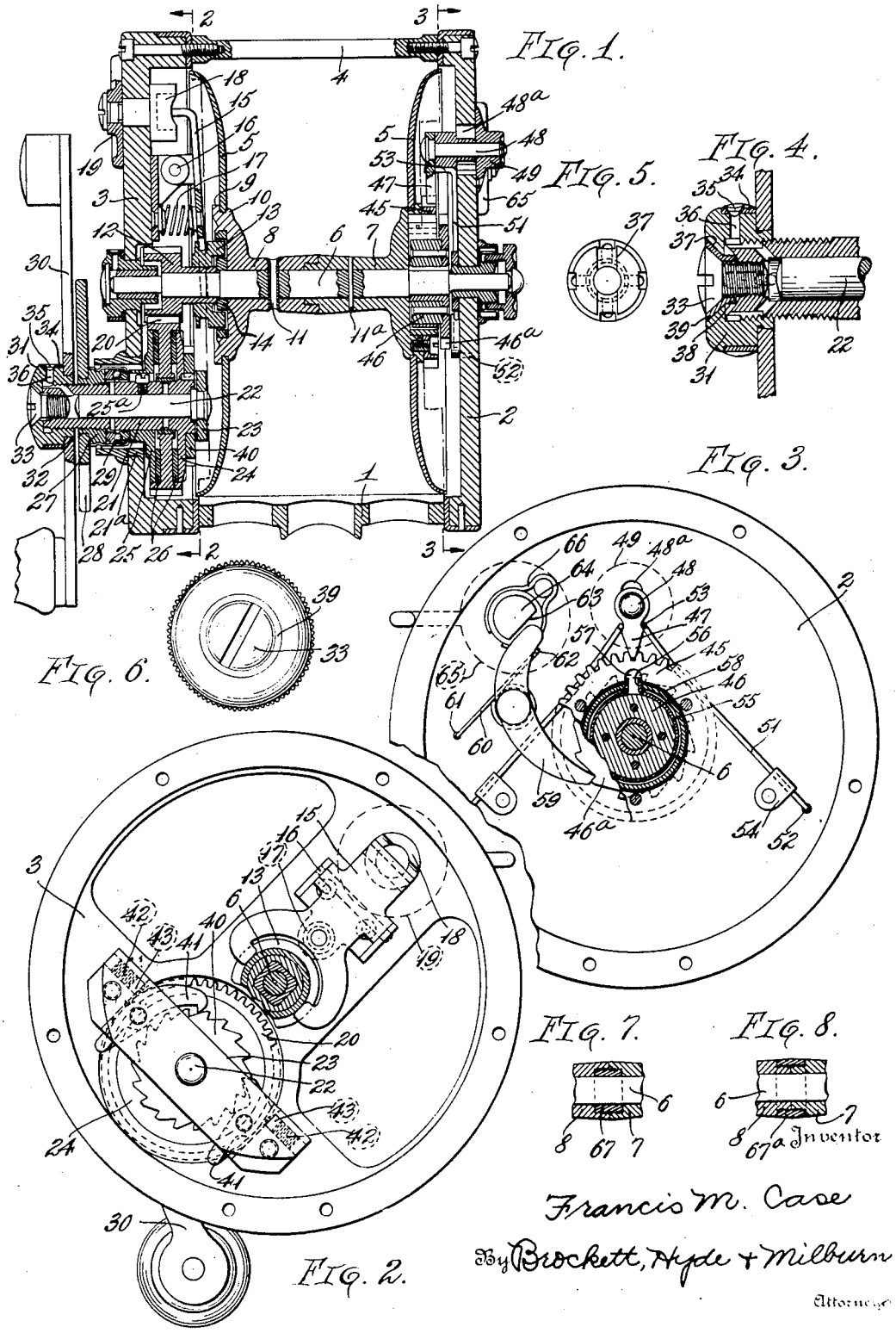

1,547,297

UNITED STATES PATENT OFFICE.

FRANCIS M. CASE, OF CLEVELAND HEIGHTS, OHIO, ASSIGNOR TO THE ENTERPRISE MANUFACTURING COMPANY, OF AKRON, OHIO, A CORPORATION OF OHIO.

FISHING REEL.

Application filed July 26, 1923. Serial No. 653,916.

*To all whom it may concern:*

Be it known that I, FRANCIS M. CASE, a citizen of the United States, residing at Cleveland Heights, in the county of Cuyahoga and State of Ohio, have invented certain new and useful Improvements in Fishing Reels, of which the following is a specification.

This invention relates to fishing reels, and more particularly to surf casting salt water reels.

The objects of the invention are to improve the construction of the spool and enable it to be more readily manufactured and assembled and to largely increase its strength so that it is more resistant to bending or distortion of the end heads on the spool hub; to improve the mounting for the main driving crank on the shaft which it drives; to provide an improved form of click; to improve the drag or brake mechanism; and generally to simplify and improve other features of the reel and secure a more efficient construction which is less liable to get out of order in service.

Further objects of the invention are in part obvious and in part will appear more in detail hereinafter.

In the drawings Fig. 1 is a longitudinal section of a reel embodying the invention; Fig. 2 is a cross section on the line 2—2, Fig. 1, looking in the direction of the arrows; Fig. 3 is a section on the line 3—3, Fig. 1; Fig. 4 is a detail view, corresponding to Fig. 1 and illustrating a modification in the crank attaching device; Fig. 5 is an end view of the crank operating sleeve or shaft, from the left in Fig. 4, other parts being omitted; Fig 6 is an end view of the parts from the left in Fig. 4; and Figs. 7 and 8 are detail sectional views illustrating modifications.

The fishing reel shown in the drawings is of the same general type and in some respects is an improvement upon the fishing reel shown in my prior application, Serial No. 546,637, filed March 25, 1922, to which reference may be had for a more complete description of such parts as may be here generally described. So far as description here is necessary said reel comprises the usual frame having a foot plate 1 adapted for attachment to the fishing rod and end caps or heads 2, 3 connected by the usual pillars or posts 4, and in which frame rotates a line receiving spool. Said spool in the present reel is of special form comprising two concave end heads 5 mounted upon the ends of a hub member, the latter being sleeved upon and rotatable with the spool shaft or spindle 6 journalled in suitable bearings in the end heads or caps 2, 3. The spool hub comprises two members 7, 8 provided respectively with male and female threads to form a separable joint midway between the end heads, such joint enabling the spool heads to be assembled on the hub ends. Each of the members 7, 8 has an enlarged end portion provided with a circumferentially extending flange 9 against which the spool head seats, each head being secured in position after assembly on its hub member by peening or beading over the metal on the inner face of the head, as indicated at 10, Fig. 1. The spool and shaft may be secured for rotation together by fitting a short piece of tubing 11 into registering diametric openings in the spindle and one hub member to form the usual line attaching means, and by a cross pin 11ª through the other hub member. The arrangement described provides a spool which is very simple to manufacture and which is strongly re-enforced against distortion of its end heads, such as by the outward pressure of the line being tightly wound into the line receiving space. Any such tendency is resisted by the strong backing flanges 9.

At one end the spindle 6 is provided with a driving pinion 12, rotatable thereon, and to which is connected a clutch member 13 rotatable with said pinion and slidable longitudinally into engagement with a clutch member 14 fast on the spool. The clutch is operated by any suitable means, such as the lever 15 pivoted at 16 and normally caused to move the clutch to clutching position by the effect of a compression spring 17. A rotatable cam 18 may however be actuated by rotating an operating button 19 to disengage the clutch and secure free spool effects.

The pinion 12 is driven by a gear 20 adapted to be frictionally driven as will appear, by rotation of a sleeve like shaft 21 journalled upon a post or stud 22 carried by a bridge 23 fixed to the end frame head. Said sleeve at one end has a flange or disk 24 lying on one side of the gear 20 and opposed to a longitudinally adjustable disc 25 lying on the other side of said gear and driven by a pin 25ª. Friction washers or disks 26 are interposed between the gear and the two discs 24, 25. The frictional pressure upon the gear 20 may be varied by longitudinally adjusting member 25 toward or from its companion member 24. This effect is secured by rotation of a nut 27 having an operating member 28 permanently secured thereto and adapted through a ball bearing 29 to exert more or less pressure on the hub of member 25.

The sleeve shaft 21 extends through a hollow boss 21ª and is rotated by the usual driving crank 30, which in this case is permanently attached to a nut 31, such as by beading over the metal as at 32. Said nut is screwed upon the end of the sleeve 21 and is secured in place by a screw 33. The driving strain of the crank is therefore transmitted directly to the end of shaft 21 instead of to a washer or shoulder thereon as is usually the case. The parts may be lubricated by rotating the ring 34 to bring its opening 35 into registration with a channel 36 leading to the end of the post 22 so that lubricant will flow to the bearing surfaces, as will appear in Fig. 1.

If desired the arrangement shown in Figs. 4, 5 and 6 may be employed. In this case the end of the sleeve 21 is slotted diametrically, as at 37, to receive tongues 38 on the small end of a conical washer 39, so that when the clamping screw 33 is screwed up there is no tendency to rotate the nut 31.

Keyed to the sleeve 21 at its inner end and neighboring the disk 24 is a ratchet 40 co-operating with one or more, two being shown, of pivoted pawls 41, each subject to the pressure of a spring 42 on a button 43, the pawls being carried by the bridge 23 before referred to. Assuming the clutch 13, 14 to be in clutching position, rotation of the crank 30 in the winding direction frictionally drives the spool to wind in the line with a force dependent upon the amount of friction in the friction drive to gear 20, with a slip in said friction drive when the pull on the line exceeds the frictional resistance. When the crank is released, however, it will not rotate in the un-winding direction, but is automatically held from such rotation by the pawls 41. Therefore, a fish attempting to run out with the line is automatically subjected to the frictional effect of the drive to gear 20 without special attention on the part of the operator. Also, when the hook is snagged the line will not be broken by excessive winding pull.

The reel may also be provided with improved click mechanism, as shown in Fig. 3. For this purpose one end of the spool has secured to rotate therewith a ratchet or click pinion 45. Co-operating with the pinion 45 is a pivoted click pawl 47 radially adjustable, as is usual, by movement of its supporting shaft 48 in a radial slot 48ª in the end plate 2, said shaft 48 being provided with a hand button 49 for this purpose. Said click pawl is subject to the effect of two springs, each comprising a substantially straight wire 51 having its opposite ends bent laterally in opposite directions, one end entering an opening 52 in the end head and the other end 53 lying at one side of the pawl. Said spring is held in place by an L shaped clip 54. This is a simple arrangement of click springs very readily attached and quite effective in operation.

The reel is also provided with improved anti-back lash or brake mechanism. For this purpose the spool has secured thereto, such as by keying them to the spindle 6, a brake drum 46 and ratchet 46ª. The brake drum 46 is surrounded by a brake band 55 having its opposite ends bent outwardly, as at 56, into a recess 57 in the spool hub. Said band is surrounded by a spring 58 the opposite ends of which lie adjacent the outwardly bent ends 56 of the band and the contracting tendency of which spring, together with the tendency of any rotation to pinch together the band ends 56, causes the band to frictionally hug the brake drum. Co-operating with the ratchet 46ª is a pawl 59 subject to the effect of a spring 60 lying at one side of the pawl pivot and having one end bent into an opening 61 in the end head and the other end 62 turned up at one side of one arm of the pawl. Said pawl in Fig. 3 is shown in operative position, in which it prevents rotation of the ratchet 46ª and subjects the spool when rotated in the line unwinding direction to the frictional effect of the brake band 55 on the brake drum. The pawl may be turned to ineffective or inoperative position by rotation of a cam 63 on a stud 64 having an operating head 65 on the outside of the casing, said stud being subject to the friction effect of a spring 66 for holding it in any position to which it may be adjusted.

Figs. 7 and 8 illustrate modified forms of spool which may be substituted for the form shown in Fig. 1. In both forms the spool hub 7 is divided transversely between its ends, but the two halves of the hub are alike, each of them being threaded for connection to threaded ring or sleeve. This ring, marked 67, in Fig. 7, is sleeved upon the spindle 6 and is externally threaded to receive internal threads of the hub members, while the sleeve 67ª shown in Fig. 8, is internally threaded to receive externally threaded portions of the hub members.

Other arrangements are also suitable for the purpose so long as the spool includes two separable parts, preferably alike in form for cheapness of manufacture and adapted for proper attachment thereto of the spool heads and rigid connection to each other when assembled for use.

What I claim is:

1. In a fishing reel, a frame, a rotatable spool therein, and braking means for said spool, comprising two members one surrounding the other and provided with a recess, a brake band surrounding the inner member and lying between said members and having tongues entering said recess, and an annular contracting spring surrounding said brake band.

2. In a fishing reel, a frame, a rotatable spool therein, and braking means for said spool, comprising two members one surrounding the other and provided with a recess, a brake band surrounding the inner member and lying between said members and having tongues entering said recess, and an annular contracting spring surrounding said brake band, and free of engagement with both of said members.

3. In a fishing reel, a frame, a rotatable spool therein, and braking means for said spool, comprising two members one surrounding the other and provided with a recess, a brake band surrounding the inner member and lying between said members and having tongues entering said recess, an annular contracting spring surrounding said brake band, the outer member being fixed to rotate with the spool, and means on the frame adapted for co-operation with the inner member to prevent its rotation in one direction.

4. In a fishing reel, a frame, a rotatable spool therein, and braking means for said spool, comprising two members one surrounding the other and provided with a recess, a brake band surrounding the inner member and lying between said members and having tongues entering said recess, an annular contracting spring surrounding said brake band, and free of engagement with both of said members, the outer member being fixed to rotate with the spool, and means on the frame adapted for co-operation with the inner member to prevent its rotation in one direction.

In testimony whereof I hereby affix my signature.

FRANCIS M. CASE.